United States Patent Office 3,741,719
Patented June 26, 1973

3,741,719
ACIDIC DISPERSE DYESTUFF PREPARATION
Visvanathan Ramanathan, Basel, and Hans Wilhelm Liechti, Oberwil, Basel-Land, Switzerland, assignors to Ciba-Geigy AG, Basel, Switzerland
No Drawing. Continuation of abandoned application Ser. No. 778,766, Nov. 25, 1968. This application July 15, 1971, Ser. No. 163,085
Int. Cl. D06p 1/18, 1/20, 1/68
U.S. Cl. 8—39  13 Claims

ABSTRACT OF THE DISCLOSURE

A dyestuff preparation which contains (1) a disperse dyestuff free from sulphonic acid and carboxyl groups which is at least partially protonated and which contains at least one non-quaternary basic nitrogen atom, (2) a non-cationic emulsifier, (3) an amount of acid which is at least equivalent to the basic nitrogen atoms present in the dyestuff, and, if desired, (4) a non-protonatable solvent miscible with water.

---

This is a continuation of application Ser. No. 778,766, filed Nov. 25, 1968, now abandoned.

The present invention provides dyestuff preparations that contain (1) a disperse dyestuff free from sulphonic acid and carboxyl groups which is at least partially protonated and which contains at least one non-quaternary basic nitrogen atom, (2) a non-cationic emulsifier, (3) an amount of acid which is at least equivalent to the basic nitrogen atoms present in the dyestuff, and, if desired, (4) a non-protonatable solvent which is miscible with water.

The dyestuff preparations of the present invention may be either in the form of a homogeneous solution (in which case practically all the dyestuff molecules will be protonated) or in the form of a dyestuff dispersion, in which case the dyestuff particles form protonated micelles. This latter embodiment of the invention may be obtained by grinding in the presence of acids.

By "disperse dyestuffs" is meant dyestuffs free from sulphonic acid or carboxyl groups which are sparingly soluble or insoluble in water at room temperature and which have affinity for synthetic fibres when applied in the form of an aqueous dispersion. They are not to be confused with basic dyestuffs of the kind which have quaternary nitrogen atoms and which are generally soluble in hot water. A definition of disperse dyestuffs is to be found, for example, in British patent specification No. 1,070,928.

Synthetic fibres that may be dyed with the dyestuff preparations of the invention are acrylic fibres made from polyacrylonitrile ad copolymers of acrylonitrile and other vinyl compounds, for example, acrylic esters, acrylamides, vinyl pyridine, vinyl chloride or vinylidene chloride, copolymers derived from dicyanoethylene and vinyl acetate and also from acrylonitrile block copolymers, fibres made from polyurethanes and cellulose triacetate and secondary acetate, fibres made from aromatic polyesters for example, fibres made from terephthalic acid and ethylene glycol or 1,4-dimethylolcyclohexane, and copolymers derived from terephthalic and isophthalic acid and ethylene glycol, polyepoxide fibres, polyamide fibres, for example, nylon 6, nylon 6.6, nylon 11 and nylon 12, and polyolefin fibres, for example, polypropylene fibres. Fibres that are specially preferred are those made from linear polyesters and/or polyacrylonitrile.

The preferred disperse dyestuffs are those having affinity for acrylic fibres.

The basic nitrogen atoms may be present in all groups capable of salt formation and that can be protonated in dilute inorganic acids, solutions of acidic salts of inorganic acids and preferably in dilute organic acids, for example, formic or acetic acid.

Dyestuffs that are specially suitable are those which contain aliphatically, cycloaliphatically, araliphatically, aromatically or heterocyclically bound primary, secondary or tertiary amino groups. The amino groups may also be part of a ring system capable of salt formation. In the case of tertiary amino groups which are present in an aromatic system capable of salt formation, preference is given, for example, to the pyridine, quinoline, isoquinoline or thiazole systems. When the amino groups are present in an aromatic system, they must not be inactivated in respect of their basicity, for example, by negative groups also bound to the aromatic nucleus.

The preferred dyestuffs to be used in accordance with the invention are monoazo and disazo dyestuffs, anthraqinone, naphthoperinone, quinothalone, phthalocyanine, nitro and methine dyestuffs, including, styryl azamethine and azostyryl dyestuffs, which contain a basic nitrogen atom capable of salt formation.

Suitable disperse dyestuffs of the anthraquinone series which contain an externally bound basic nitrogen atom are, for example, the dyestuffs of the general formula

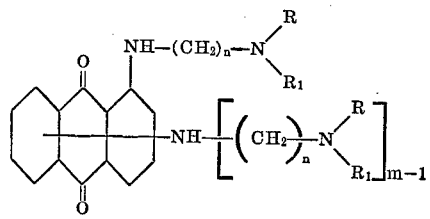

and

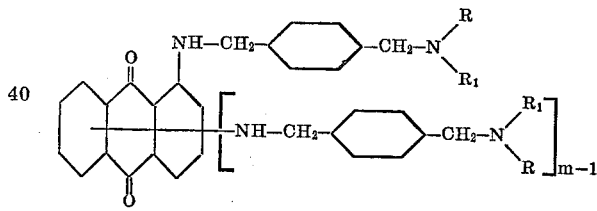

in which $n$ represents a number within the range of from 2 to 6, $m=1$ or 2 and R and $R_1$ each represents an alkyl group, which groups, together with the nitrogen atom, may be a morpholine or piperidine residue; such dyestuffs are described, for example, in British patent specifications Nos. 1,053,300, 1,053,535 and 1,053,536.

Suitable disperse dyestuffs belonging to the specially preferred azo dyestuff class are those listed in the Colour Index under the numbers 11,930 and 12,130 and also the dyestuffs of the formulae

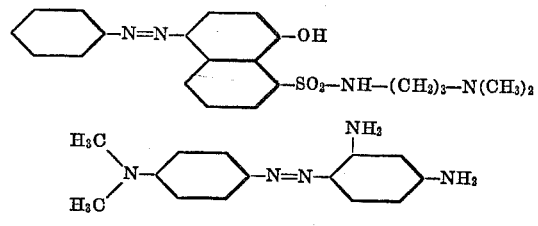

Further suitable monoazo dyestuffs are those of the formula

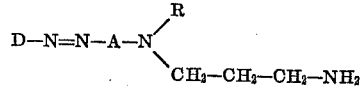

in which D represents a diazo residue of the phenol or naphthalene series that is free from carboxyl and sulphonic acid groups, A represents a paraphenylene residue that may be substituted and R represents an alkyl residue that may be substituted.

Further specially preferred dyestuffs are those mentioned in French patent specification No. 1,445,370 of the formula

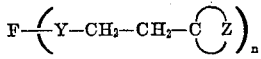

in which $n$ stands for 1 or 2, F represents the residue of an azo dyestuff of the pyrazolone or aminopyrazole series which is free from sulphonic acid or carboxyl groups,

represents the residue of a heterocyclic aromatic residue, especially a 2- or 4-pyridyl residue, and Y represents a bond or a divalent residue.

Compounds suitable for use as the emulsifier component (2) in the dyestuff preparations of the invention are water-soluble, non-cationic, but especially non-ionic, surfactants. These emulsifiers may also be used in combination with anionic emulsifiers or, if desired, they may be replaced by anionic emulsifiers. The amount of emulsifier used may vary within wide limits. Advantageously, however, the ratio of dyestuff to emulsifier by weight is within the range of from 1:1 to 1:100, preferably within the range of from 1:4 and 1:10.

Important members of such non-ionic surfactants are, in particular, the following types of compound: (a) ethers of polyhydroxy compounds, for example, polyhydroxyalkylated fatty alcohols, polyhydroxyalkylated polyols, polyhydroxyalkylated mercaptans and aliphatic amine, polyhydroxyalkylated alkylphenols and -naphthols, polyhydroxyalkylated alkylarylmercaptans and alkylarylamines. (b) Fatty acid esters of ethylene glycols and polyethylene glycols, propylene glycol and butylene glycol, glycerol or polyglycerols and pentaerythritol, and also of sugar alcohols, for example, sorbitol, sorbitan and of saccharose. (c) N-hydroxyalkyl-carboxylic acid amides, polyhydroxyalkylated carboxylic acid amides and sulphonamides.

When the surfactant contains a basic nitrogen atom, at least an equivalent amount of acid, for example, acetic acid, is added until the surfactant is neutral or acid in reaction.

Surfactants belonging to the following groups may advantageously be used: addition compounds derived from 8 mols of ethylene oxide and 1 mol of para-tert.-ocetylphenol; 15 or 16 mols of ethylene oxide and castor oil; 20 mols of ethylene oxide and the alcohol $C_{16}H_{33}OH$; addition compounds of ethylene oxide and di-[α-phenylethyl]-phenols, polyethylene-tert.-dodecylthioether, polyamine-polyglycolether; addition compounds of 15 or 30 mols of ethylene oxide and 1 mol of the amine $C_{12}H_{25}NH_2$ or $C_{18}H_{37}NH_2$, and so forth.

Compounds suitable for use as the acid component (3) are weak inorganic acids, for example, phosphoric acid, the acid salts thereof, for example, monosodium phosphate, and especially organic acids, for example, acetic acid, propionic acid and formic acid.

These acids may be used either in concentrated form or as aqueous, for example, 50%, solutions.

Suitable solvents that are miscible with water, virtually non-protonatable in the presence of aqueous acids and that must be stable towards acids are, for example, as follows: ketones, for example, acetone; acetals, for example, dioxane, tetrahydrofuran, glycerol formaldehyde and glycol formaldehyde; acetonitrile and diacetone-alcohol. Also suitable are higher-boiling glycol derivatives, for example, ethylene glycol monomethylether, ethylene glycol monoethyl ether and ethylene glycol monobutylether, diethyleneglycol monomethylether and diethyleneglycol monoethylether, thiodiglycol, polyethylene glycols, insofar as they are liquid at room temperature, and especially those of the group which boil at a temperature above 120° C., and also active solvents that are miscible with water, for example, N,N-dimethylformamide, N,N-dimethylacetamide, bis-(dimethylamido)-methane-phosphate, tris-(dimethylamido)-phosphate, N-methylpyrrolidone, 1,5 - dimethylpyrrolidone, N,N - dimethylmethoxyacetamide, N,N,N',N'-tetramethylurea, tetramethylenesulphone (sulpholan), 3-methylsulpholan and dimethylsulphoxide. If desired, hydrolysable solvents may also be used, for example, ethylene-carbonate, propylene-carbonate or butyrolactone, especially in the presence of organic acids.

Among the hydrophilic solvents to be used in accordance with the invention there are three preferred sub-groups, namely (1) those that are suitable for dissolving linear synthetic polymers or polycondensates, for example, acrylonitrile polymers, that are capable of being spun; (2) solvents that are miscible with water in all proportions; (3) solvents free from hydroxyl groups.

When larger amounts of liquid surfactants are used, for example, a surfactant-dyestuff ratio greater than 1, homogeneous dyestuff preparations may still be obtained. In this case the surfactant replaces the solvent. It is preferable to use surfactants that are miscible with water in all proportions for dyestuff preparations of this kind.

When the dyestuff dissolves easily, the dyestuff preparations may be obtained by mixing and stirring or kneading the three or four components. On the other hand, when a dyestuff dispersion is to be prepared, especially a dispersion free from solvent, manufacture is effected by grinding the components in a conventional wet-grinding apparatus, for example, a ball mill, a baffle plate impact mill, and so forth.

The present invention also provides a process for the manufacture of dyestuff preparations, wherein (1) a disperse dyestuff free from sulphonic acid and carboxyl groups which contains a basic nitrogen atom, (2) a non-cationic emulsifier, (3) an amount of acid which is at least equivalent to the basic nitrogen atoms in the dyestuff, and, if desired, (4) a non-protonatable solvent miscible with water are ground together in the wet state.

The dyestuff preparations of the invention may be used for dyeing the synthetic fibres mentioned above after dispersion in a dyebath. Liquors produced in this manner yield pure, strong dyeings on polyester fabrics at a temperature close to 100° C., or at a temperature above 100° C. under superatmospheric pressure.

The dyestuff preparations of the invention and the liquors prepared therewith are specially suitable for dyeing acrylic fibres.

The present invention therefore also provides a process for dyeing synthetic fibres, preferably polyacrylic fibres and/or polyester fibres, wherein dyeing is carried out in an acidic dye liquor prepared by means of dyestuff preparations which contain (1) a disperse dyestuff free from sulphonic acid and carboxyl groups which is at least partially protonated and which contains at least one non-quaternary basic nitrogen atom, (2) a non-cationic emulsifier, (3) an amount of acid at least equivalent to the basic nitrogen atoms present in the dyestuff, and, if desired, (4) a non-protonatable solvent miscible with water, and which have been prepared by the wet grinding of the above components.

The dyeings produced by the process of the present invention, especially dyeings on polyester fibres and/or acrylic fibres, are advantageously subjected to an after-treatment, for example, by heating in an aqueous solution of a non-ionic detergent.

The dyestuff preparations of the invention may also be applied by printing processes. In this method of application, dyestuff preparations are used to which the usual printing adjuvants, for example, wetting and thickening agents, have been added. Whereas the dyestuff preparations normally contain a fairly large amount of water

EXAMPLE 9

1 part of the dyestuff of the formula

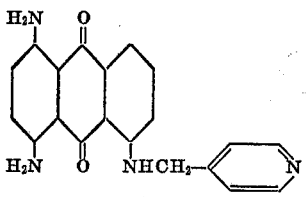

1 part of the adduct derived from 1 mol of oleylamine and 8 mols of ethylene oxide, 1 part of acetic acid, 2 parts of formamide are ground in a mill. The preparation so obtained may be used per se in the preparation of a dyebath.

EXAMPLE 10

1 part of the dyestuff of the formula

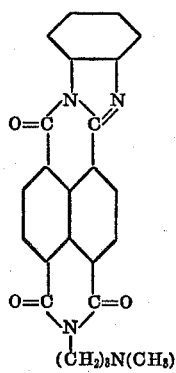

1 part of a 50% neutralized reaction product derived from 1 mol of a higher alkylamine having about 20 carbon atoms and 30 mols of ethylene oxide, 1 part of acetic acid, 1 part of sulpholan and 6 parts of water are ground in a mill. The preparation so obtained may be added directly to a dyebath.

EXAMPLE 11

1 part of the dyestuff of the formula

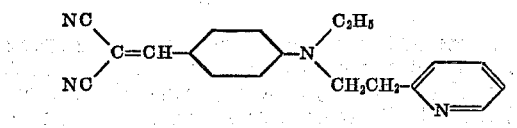

1 part of the adduct derived from 1 mol of oleylamine and 8 mols of ethylene oxide, 1 part of propionic acid and 2 parts of N-methylpyrrolidone are ground in a mill. The preparation so obtained may be used per se in the preparation of a dyebath.

EXAMPLE 12

1 part of the dyestuff of the formula

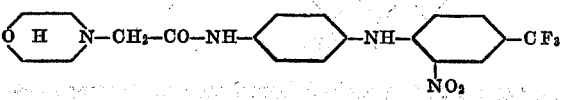

1 part of a 50% neutralized reaction product derived from 1 mol of a higher alkylamine having about 20 carbon atoms and 30 mols of ethylene oxide, 1 part of oxalic acid and 1 part of ethylene carbonate are ground in a mill together with 6 parts of water. The preparation so obtained may be used per se in the preparation of a dyebath.

A preparation which is equally as good may be obtained by using the nitro dyestuff of the following formula

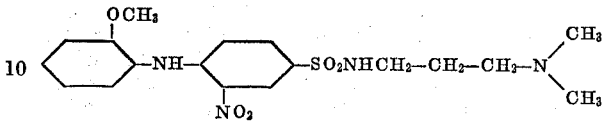

EXAMPLE 13

1 part of the dyestuff of the formula

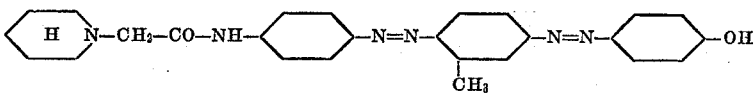

1 part of the adduct derived from 9 mols of ethylene oxide and 1 mol of nonylphenol, 1 part of sodium hydrogen phosphate and 1 part of N-methylpyrrolidone are ground in a mill together with 6 parts of water. The preparation so obtained may be used per se in the preparation of a dyebath.

EXAMPLE 14

1 part of the dyestuff of the formula

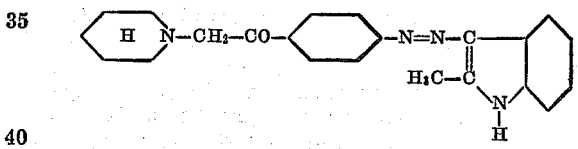

1 part of the adduct derived from 1 mol of oleylamine and 8 mols of ethylene oxide, 1 part of acetic acid and 1 part of butyrolactone are ground in a mill together with 6 parts of water. The preparation so obtained may be used per se in the preparation of a dyebath.

We claim:

1. An acidic dyestuff preparation consisting essentially of
   (a) a disperse dyestuff,
   (b) from 1 to 100 parts by weight of a non-ionic emulsifier per part by weight of dyestuff,
   (c) at least 0.2 part by weight per part by weight of dyestuff of a weak acid having a dissociation constant of from 1.96 to 4.88, the quantity of acid added additionally being at least equivalent to any basic nitrogen atoms present in the dyestuff and emulsifier.

2. A dyestuff preparation according to claim 1 in which the disperse dyestuff contains a basic nitrogen atom capable of salt formation.

3. A dyestuff preparation according to claim 1 in which the emulsifier is a polyoxyalkylated aliphatic amine.

4. A dyestuff preparation according to claim 1 in which the emulsifier is a polyoxyalkylated alkylphenol.

5. A dyestuff preparation according to claim 1 in which the weak acid is an organic acid having not more than 4 carbon atoms.

6. A dyestuff preparation according to claim 1 in which additionally contains a water-miscible, acid stable solvent.

7. A dyestuff preparation according to claim 6 in which the solvent boils above about 100° C.

8. A dyestuff preparation according to claim 7 in which the solvent is the amide of a low molecular weight fatty acid which is added during the wet grinding process or which stems from the acid component, when they are to be used for printing the water content should be kept sufficiently low to enable them to be used per se in the preparation of the printing paste, after the usual adjuvants have been added.

The term "non-ionic emulsifiers" also embraces those emulsifiers which, although they contain amine nitrogen atoms, do not behave like cationic emulsifiers in neutral solution, but like non-ionic emulsifiers. These emulsifiers have no affinity for polyacrylonitrile. Representatives of this series of emulsifiers are to be found in the table of nonionic emulsifiers on pages 70–71 of Ullmanns Encyclopädie der technischen Chemie, 3rd edition, vol. 7, Munich and Berlin, 1956.

The following examples illustrate the invention. Unless otherwise stated, the parts and percentages are by weight.

EXAMPLE 1

1 part of the dyestuff of the formula

[chemical structure]

1 part of a 50% neutralized reaction product derived from 1 mol of a higher alkylamine having about 20 carbon atoms and 30 mols of ethylene oxide, 1 part of concentrated acetic acid and 7 parts of water are ground to a fine dispersion in a ball mill.

The dyestuff preparation so obtained is added to a dyebath comprising 4,000 parts of water and 4 parts of a 50% solution of a condensation product derived from 1 mol of 1-methyl-2-heptadecylbenzimidazole and 7 moles of ethylene oxide, the bath having been adjusted to a pH of 4 with acetic acid. 100 parts of well-wetted polyacrylonitrile flocks are entered into the dyebath, the temperature is raised to the boil within 30 minutes and dyeing is carried out for 1½ hours at the boil. The dyed material is then well rinsed. A level yellow dyeing possessing very good fastness to rubbing is obtained.

EXAMPLE 2

1 part of the dyestuff of the formula

[chemical structure]

1 part of the adduct derived from 9 mols of ethylene oxide and 1 mol of nonylphenol, 1 part of glacial acetic acid and 1 part of diethylene glycol monoethylether are ground in a mill. The preparation so obtained may be used per se in the preparation of a dyebath.

EXAMPLE 3

1 part of the dyestuff of the formula

[chemical structure]

1 part of a 50% neutralized reaction product derived from 1 mol of a higher alkylamine containing about 20 carbon atoms and 30 mols of ethylene oxide, 1 part of glacial acetic acid, 1 part of ethyl lactate and 6 parts of water are ground in a mill. The preparation so obtained may be added directly to a dyebath.

EXAMPLE 4

1 part of the dyestuff of the formula

[chemical structure]

1 part of the adduct derived from 1 mol of oleylamine and 8 mols of ethylene oxide, 1 part of formic acid and 2 parts of sulpholan are ground in a mill. The preparation so obtained may be used per se in the preparation of a dyebath.

EXAMPLE 5

20 parts of the dyestuff of the formula

[chemical structure]

are stirred at 50 to 60° C. into a mixture comprising 30 parts of tetrahydrofurfurylalcohol, 20 parts of glacial acetic acid, 25 parts of water and 5 parts of a 50% neutralized reaction product derived from 1 mol of a higher alkylamine having about 20 carbon atoms and 30 mols of ethylene oxide. The dyeing preparation so obtained, which is also a stable solution at room temperature, is used per se in the preparation of a dye-bath as described in Example 1. A level blue dyeing having good fastness to rubbing is obtained.

EXAMPLE 6

20 parts of the dyestuff used in Example 5 are stirred at 50 to 60° C. into a mixture comprising 30 parts of dimethylformamide, 20 parts of glacial acetic acid, 20 parts of water and 10 parts of the adduct obtained from 1 mol of oleylamine and 8 mols of ethylene oxide. The dyeing preparation so obtained, which is also stable at room temperature, may be used per se in the preparation of a dyebath.

EXAMPLE 7

1 part of the dyestuff of the formula

[chemical structure]

1 part of the adduct derived from 9 mols of ethylene oxide and 1 mol of nonylphenol, 0.5 part of oxalic acid, 2.5 parts of ethylene glycol and 5 parts of water are ground in a mill. The preparation so obtained my be used per se in the preparation of a dyebath.

EXAMPLE 8

1 part of the dyestuff of the formula

[chemical structure]

1 part of the adduct derived from 9 mols of ethylene oxide and 1 mol of nonylphenol, 0.2 part of phosphoric acid, 1 part of thiodiglycol and 6.8 parts of water are ground in a mill. The preparation so obtained may be added directly to a dyebath.

9. A dyestuff preparation according to claim 8 in which the solvent is N,N-dimethylacetamide or N,N-dimethylformamide.

10. A dyestuff preparation according to claim 8 in which the solvent is N-methylpyrrolidone.

11. A dyestuff preparation according to claim 7 in which the solvent is sulpholan, 3-methylsulpholan or dimethylsulphoxide.

12. A dyestuff preparation according to claim 7 in which the solvent is dioxane

13. A dyestuff preparation according to claim 7 in which the dyestuff, emulsifier, acid and solvent are ground together.

References Cited

UNITED STATES PATENTS 3,265,461  9/1966  Luetznel et al. _____ 8—42 X

OTHER REFERENCES

Du Pont Tech., Bull. P–229, October 1969, p. 17.

GEORGE F. LESMES, Primary Examiner

P. C. IVES, Assistant Examiner

U.S. Cl. X.R.

8—41 A, C, 174, 168, 85, 41 B, D, 62, 71